US006990804B2

(12) United States Patent
Jacob et al.

(10) Patent No.: US 6,990,804 B2
(45) Date of Patent: Jan. 31, 2006

(54) COMBINATION EXHAUST GAS POST TREATMENT/MUFFLER DEVICE IN THE EXHAUST GAS SECTION OF AN INTERNAL COMBUSTION ENGINE

(75) Inventors: Eberhard Jacob, Krailling (DE); Hans-Peter Mai, Gaggenau (DE)

(73) Assignees: MAN Nutzfahrzeuge AG, (DE); Roth-Technik Austria Ges.m.b.H, (AT)

( * ) Notice: Subject to any disclaimer, the term of this patent is extended or adjusted under 35 U.S.C. 154(b) by 0 days.

(21) Appl. No.: 10/822,542

(22) Filed: Apr. 12, 2004

(65) Prior Publication Data

US 2004/0202590 A1 Oct. 14, 2004

(30) Foreign Application Priority Data

Apr. 11, 2003 (DE) ................................ 103 16 802

(51) Int. Cl.
*F01N 3/10* (2006.01)
(52) U.S. Cl. .............................. 60/299; 60/297; 60/300; 60/311; 60/312; 181/251; 181/264; 181/272; 422/172; 422/177

(58) Field of Classification Search .................. 60/299, 60/295, 297, 300, 302, 311, 312, 322; 181/241, 181/251, 264, 268, 272, 274, 275; 422/171, 422/172, 170, 177, 180
See application file for complete search history.

(56) References Cited

U.S. PATENT DOCUMENTS

| 4,899,540 | A | * | 2/1990 | Wagner et al. ................ 60/274 |
| 4,916,897 | A | * | 4/1990 | Hayashi et al. ............... 60/286 |
| 5,063,736 | A | * | 11/1991 | Hough et al. ................. 60/286 |
| 5,285,640 | A | * | 2/1994 | Olivo ........................... 60/274 |
| 6,722,124 | B2 | * | 4/2004 | Pawson et al. ............... 60/286 |
| 6,729,127 | B2 | * | 5/2004 | Woerner et al. .............. 60/297 |
| 2004/0074231 | A1 | | 4/2004 | Bruck |

FOREIGN PATENT DOCUMENTS

EP 1 262 641 12/2002

* cited by examiner

*Primary Examiner*—Binh Q. Tran
(74) *Attorney, Agent, or Firm*—Robert W Becker & Associates; Robert W Bekcer

(57) ABSTRACT

A combination exhaust gas post treatment/muffler device in the exhaust gas section of an internal combustion engine is provided. A special platinum-coated preliminary oxidation catalytic converter is combined with at least one particle separator, which is exactly coordinated therewith, in a muffler to achieve carbon particle separation rates of greater than 50%.

6 Claims, 6 Drawing Sheets

FIG. 9

| Vari-ant | Fig. | P-Cat * (15) | | | | | | | PM-Separator (16) | | | | | | ESC ** % | ETC *** % |
|---|---|---|---|---|---|---|---|---|---|---|---|---|---|---|---|---|
| | | Dimension (mm) Ø x l | Cellular Structure (cpsi) | Vol-ume (l) | Channel Velocity KG (m/sec) | Aspect Ratio AR l/Øeff | Platinum Coating (g/l) | (g) | No. | Dimension (mm) Ø x l | Cellular Struc-ture (cpsi) | Vol-ume (l) | Channel Velocity KG (m/sec) | Aspect Ratio AR l/Øeff | | |
| 1 | 1,2 | 220 x 101,5 | 200 | 4,0 | 9,3 | 0,46 | 1,41 | 5,6 | 4 | 150 x 150 | 200 | 10,6 | 5,9 | 0,50 | 55 | 50 |
| 2 | 1,2 | 220 x 101,5 | 200 | 4,0 | 9,3 | 0,46 | 1,41 | 5,6 | 4 | 150 x 225 | 200 | 15,9 | 5,9 | 0,75 | 70 | 71 |
| 3 | 1,2 | 220 x 101,5 | 200 | 4,0 | 9,3 | 0,46 | 1,41 | 5,6 | 4 | 150 x 300 | 200 | 21,2 | 5,9 | 1,00 | 82 | 79 |
| 4 | 3,4 | 220 x 101,5 | 200 | 4,0 | 9,3 | 0,46 | 1,41 | 5,6 | 3 | 150 x 150 | 200 | 8,0 | 7,9 | 0,58 | 55 | 53 |
| 5 | 3,4 | 200 x 101,5 | 200 | 3,1 | 9,3 | 0,51 | 1,41 | 4,4 | 3 | 150 x 150 | 200 | 8,0 | 7,9 | 0,58 | 56 | 52 |
| 6 | 5,6 | 200 x 101,5 | 200 | 3,1 | 9,3 | 0,51 | 1,41 | 4,4 | 1 | 254 x 150 | 200 | 7,5 | 8,2 | 0,59 | 55 | 52 |
| 7 | 7,8 | 200 x 101,5 | 200 | 3,1 | 9,3 | 0,51 | 1,41 | 4,4 | 1 | 220 x 150 | 200 | 5,7 | 11 | 0,68 | 54 | 52 |
| 8 | 7,8 | 200 x 101,5 | 160 | 3,1 | 9,3 | 0,51 | 1,25 | 3,9 | 1 | 220 x 150 | 200 | 5,7 | 11 | 0,68 | 54 | 52 |
| 9 | 7,8 | 200 x 101,5 | 160 | 3,1 | 9,3 | 0,51 | 1,25 | 3,9 | 1 | 220 x 150 | 160 | 5,7 | 11 | 0,68 | 53 | 51 |
| 10 | 7,8 | 180 x 101,5 | 160 | 2,6 | 14 | 0,56 | 1,04 | 2,7 | 1 | 220 x 150 | 160 | 5,7 | 11 | 0,68 | 52 | 51 |

\* = platinum coated
\*\* = european steady state cycle (ESC)
\*\*\* = european transient cycle (ETC)
Øeff = diameter effective at inlet of the round entry surface of a P-cat 15 and a PM separator 16 (if only one is used) or for more PM separators 16 their overall entry surface assuming a circular surface and the resulting diameter.

All data pertaining to the channel velocity KG and conversion relate to a maximum exhaust gas volume flow of 1200 Nm³/h at a raw particle emission of the exhaust gas delivered by the test diesel engine of approximately 40mg/KWh with the ESC test and approximately 50mg/KWh with the ETC test.

Best mode = Variant 3

COMBINATION EXHAUST GAS POST TREATMENT/MUFFLER DEVICE IN THE EXHAUST GAS SECTION OF AN INTERNAL COMBUSTION ENGINE

BACKGROUND OF THE INVENTION

The present invention relates to a combination exhaust gas post treatment/muffler device in the exhaust gas section of an internal combustion engine, especially a diesel engine of a commercial vehicle such as a truck or bus, and includes a muffler, which is spatially delimited by a front and rear end wall as well as a peripheral outer wall, and in the interior of which is built in at least one preliminary oxidation catalytic converter, which significantly increases the amount of $NO_2$ in the exhaust gas that is flowing through, and at least one, especially catalytic, particle separator, whereby exhaust gas that is to undergo post treatment can be introduced into the muffler via an inlet tube, and after flowing through the preliminary oxidation catalytic converter as well as the particle separator or separators can again be conveyed out of the muffler in a clean and indirectly muffled state.

In the following, the discussion concerns PM-KAT systems. PM-KAT® is a trademark of the applicant MAN Nutzfahrzeuge Aktiengesellschaft. PM-KAT systems refer to non-blocking means for reducing soot or carbon particles in the exhaust gas of diesel engines. Such PM-KAT systems comprise at least one preliminary oxidation catalytic converter, subsequently referred to as P-cat, the carrier of which is coated with platinum as the active component, and a downstream, especially catalytic, particle separator, subsequently abbreviated as PM separator. Such a PM separator, could, for example, have the configuration or structure disclosed in DE 100 20 120 C1. For trucks, an arrangement has been disclosed of a P-cat in a preliminary muffler that is disposed as close as possible to the internal combustion engine, and of one or more separators in the main muffler (see DE 101 23 358 A1).

Figure 10:
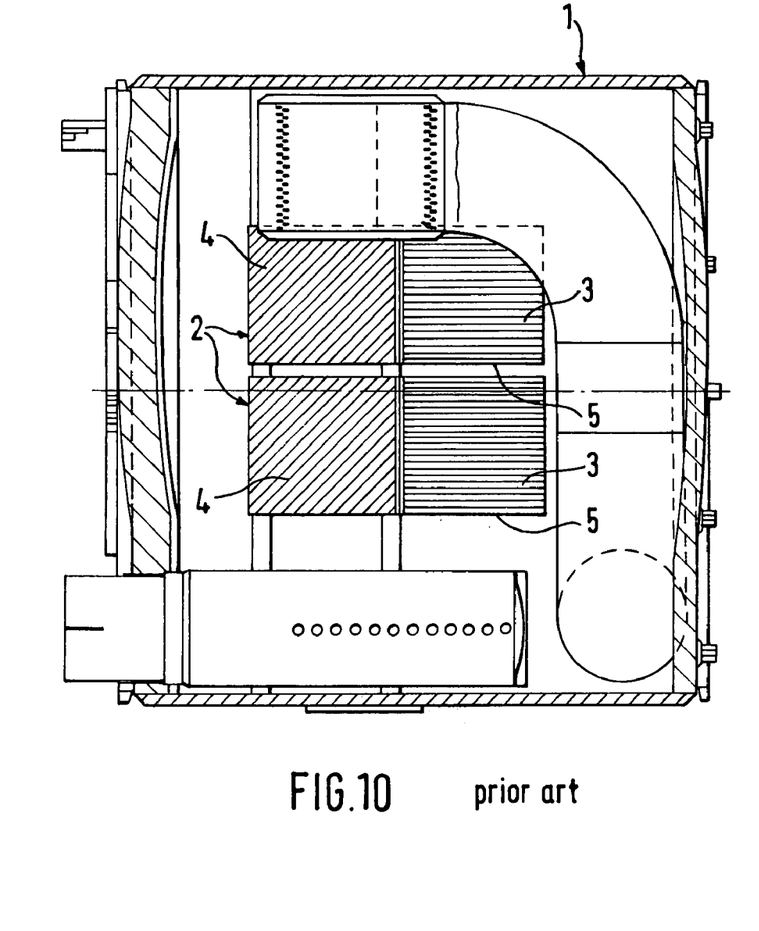
FIGS. 10 and 11 show prior art and serve for the clarification of the state of the art from which the present application proceeds.
Figure 11:
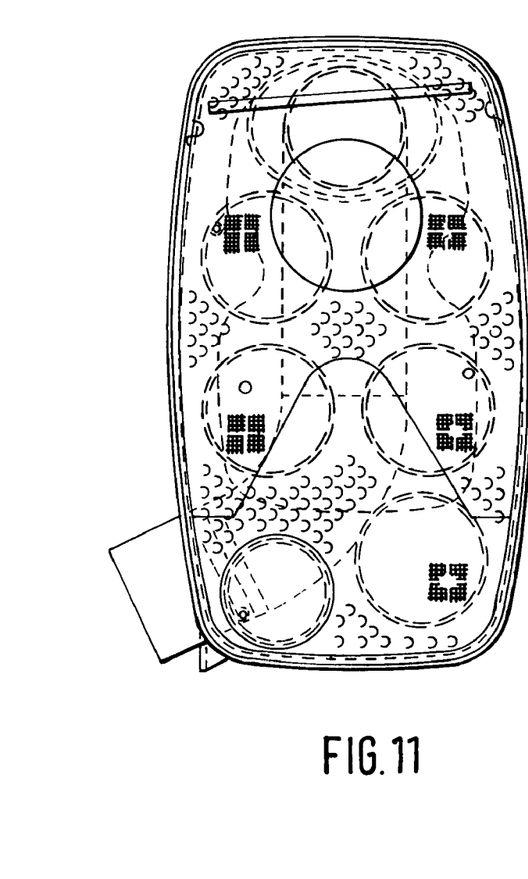

In addition, the integration of the PM-KAT System in a commercial vehicle muffler was disclosed at the twenty-third International Viennese Motor Symposium on 25 and 26 Apr. 2002 and was documented in the Progress Reports, VDI Series 12 No. 490, Volume 2 Düsseldorf, VDI publication 2002, page 196–216. FIGS. 10 and 11 show this MP-KAT system of this literature citation. There it can be seen that disposed in the muffler 1 are four exhaust gas post treatment modules 2 for parallel flow therethrough, whereby each of the modules is encased in a casing 5 and is provided with a circular cylindrical P-cat 3 and following coaxially directly thereafter a circular cylindrical PM separator 4 having the same diameter. This integration of the PM-KAT system of the muffler 1 is provided when with a truck or bus there is no space for accommodating a preliminary muffler close to the engine. However, the drawback of this integration solution is a PM separator volume that is reduced by the volume of the P-cat, because the outer dimensions of the muffler 1 are dictated by the vehicle and can therefore not be increased. This leads to unsatisfactory separation rates of significantly less than 50%. Even an increase of the platinum concentration in the P-cat and an additional coating of the inner structures of the PM separator or separators would not lead to the goal of increasing the separation rate/conversion in the ETC (European Transient Cycle). Platinum is very expensive and therefore determines to a very considerable extent the cost of the overall system.

It is therefore an object of the present application, in a combination exhaust gas post treatment/muffler device of the aforementioned general type, to accommodate in the muffler a P-cat and PM separator having such a volume and such a shape and design that particle conversion rates of at least 50%, preferably, however, considerably greater than 50% in the ETC, can be achieved while using a minimum amount of platinum in the P-cat.

BRIEF DESCRIPTION OF THE DRAWINGS

This object, and other objects and advantages of the present invention, will appear more clearly from the following specification in conjunction with the accompanying schematic drawings, in which:

FIG. 9 is a table in which in ten lines are listed the data of ten different exemplary combinations of a P-cat with one or more PM separators.

SUMMARY OF THE INVENTION

The combination exhaust gas post treatment/muffler device of the present application is characterized primarily in that the free exhaust gas inlet surface of the preliminary oxidation catalytic converter is considerably smaller than the free exhaust gas inlet surface of the particle separator or separators, in that the aspect ratio $AR=I/\emptyset_{eff}$ of the preliminary oxidation catalytic converter is approximately between 0.4 and 0.6, in that the aspect ratio $AR=I/\emptyset_{eff}$ of the particle separator or separators is approximately between 0.5 and 1.0, in that the volume of the preliminary oxidation catalytic converter is between approximately 2.5 and 4 liters, the volume of the particle separator or separators is between approximately 5.5 and 22 liters, and the ratio of the volume of the catalytic converter to the volume of the particle separator or separators is between approximately 0.15 and 0.55, in that the ratio of the aspect ratio of the particle separator to the aspect ratio of the catalytic converter is between approximately 1.05 and 2.2, and in that at maximum exhaust gas volume flow [$Nm^3/h$] the channel velocity, which results from exhaust gas volume flow/free exhaust gas inlet surface, in the preliminary oxidation catalytic converter is greater than 8 m/sec and in the particle separator or separators is greater than 5 m/sec, whereby the maximum exhaust gas volume flow is delimited by the maximum permissible pressure loss and the maximum permissible exhaust gas pressure with respect to the functionality of the internal combustion engine that supplies the exhaust gas.

In contrast to the known solution of FIGS. 10 and 11 having four P-cats, with the present invention, the volume of the single P-cat is smaller by a factor of 2.5–3.5, and in addition the use of platinum for the coating of the P-cat is reduced, depending upon the embodiment, by a factor of 3.3–11.7. This saves an enormous amount of costs. In addition, with this only relatively small P-cat, more space is provided for the PM separator or separators, and a significant increase of the particle conversion is achieved.

Further specific features of the present application will be described in detail subsequently.

DESCRIPTION OF SPECIFIC EMBODIMENTS

Referring now to the drawings in detail, FIGS. 1–8 show a combination exhaust gas post treatment/muffler device that is disposed in the exhaust gas section of an internal combustion engine, especially a diesel engine of a commercial vehicle such as a truck or bus. This device has a muffler 10 that is spatially delimited by a front end wall 11, a rear end wall 12 and a peripheral outer wall 13, whereby the latter can have a round, oval, square or somewhat rectangular cross-section, and in a longitudinal direction can be cylindrical or can bulge in a barrel-shaped manner. Leading into the interior of the muffler 10 is an exhaust gas inlet tube 14 to which the exhaust gases of the pertaining internal combustion engine can be fed via a non-illustrated exhaust gas line. Built into the interior of the muffler 10 are additionally a preliminary oxidation catalytic converter 15 (subsequently called P-cat 15), which due to its platinum coating significantly increases the amount of $NO_2$ in the exhaust gas that flows through, and at least one in particular catalytic particle separator 16 (subsequently called PM-separator 16). The reference numeral 17 indicates a sound-dampening end tube via which clean exhaust gas is conducted out of the interior of the muffler 10 and into the atmosphere. Exhaust gas that is to be post treated is consequently supplied via the exhaust gas inlet tube 14 to the muffler 10, from there flows first through the P-cat 15 and subsequently through the PM separator or separators 16, and is subsequently again conveyed out of the muffler 10 in a cleaned and indirectly sound-dampened manner via the end tube 17. The end walls 11,12 and, to the extent necessary, also the peripheral outer wall 13 as well as the end tube 17, are coated with sound-dampening material. Also contributing to the sound dampening or muffling are special designs in the region of the introduction and discharge of the exhaust gas, as well as transverse walls within the muffler, as will be described in greater detail subsequently.

In the three examples of FIGS. 1,2 and 3,4 and 5,6, the P-cat has a circular cylindrical configuration, and is built into a housing 18 of austenitic or ferritic stainless steel, and in particular parallel to the longitudinal axis 19 of the muffler 10. Extending a certain amount into the entry chamber 20 of this housing 18, which initially widens in a funnel-shaped manner from the front end wall 11 and then continues cylindrically, is the exhaust gas inlet tube 14, which at that location is preferably provided with a perforation or holes 21 so that the supplied exhaust gas can exit the exhaust gas inlet tube 14 not only radially but also axially into the entry chamber 20, and can then flow through the P-cat 15, which is enclosed in the cylindrical portion of the housing 18.

Each of the PM separators 16 that is present in these three examples has a circular cylindrical configuration, is also built into a housing 22 of austenitic or ferritic stainless steel, and together with the housing is disposed parallel to the axis 19 of the muffler therein. In this connection, in the example of FIGS. 1 and 2 four, in the example of FIGS. 3 and 4 three, and in the examples of FIGS. 5 and 6 one such housing 22, with built-in PM separator 16, is disposed above and/or next to the housing 18 with the P-cat built therein. To fix the position of the housings 20 and 22, a transverse wall 23 is provided in the muffler; this transverse wall is preferably made gas-permeable via a perforation or holes, so that the exhaust gas that leaves the P-cat 15 after flowing therethrough can, prior to flowing through the PM separator or separators 16, separate on the outside about these separators and can therefore preheat or hold them at a favorable operating temperature. With all three examples of FIGS. 1 to 6, the PM separator or separators 16 open into a discharge chamber 24, that within the muffler 10 is, via walls 25 and 26, gas tight relative to the rest of the interior of the muffler 10. The end tube 17 also communicates with this chamber 24. The wall 25, which is parallel to the transverse wall 23, via openings or apertures, respectively spans the outlet side end regions of the PM separator housing or housings 22 and the inlet region of the end tube 17 in a gas tight manner and thus also contributes to the fixing of the position thereof in the muffler 10.

Figure 7:
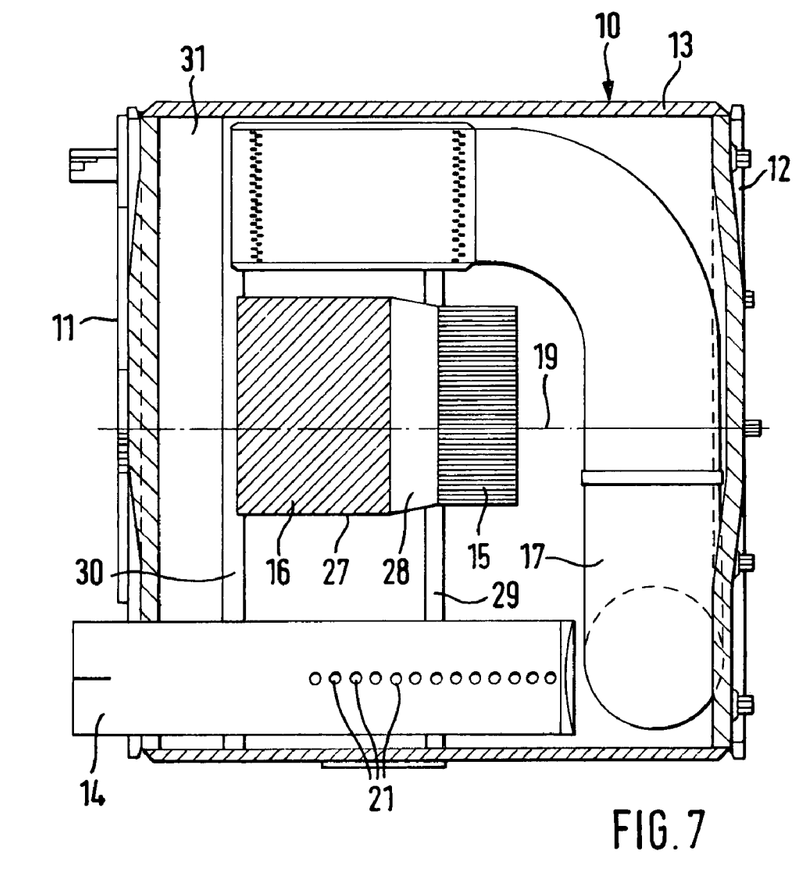
FIGS. 7 and 8 show, in a longitudinal section and in a front view respectively, a fourth embodiment of the invention.
Figure 8:
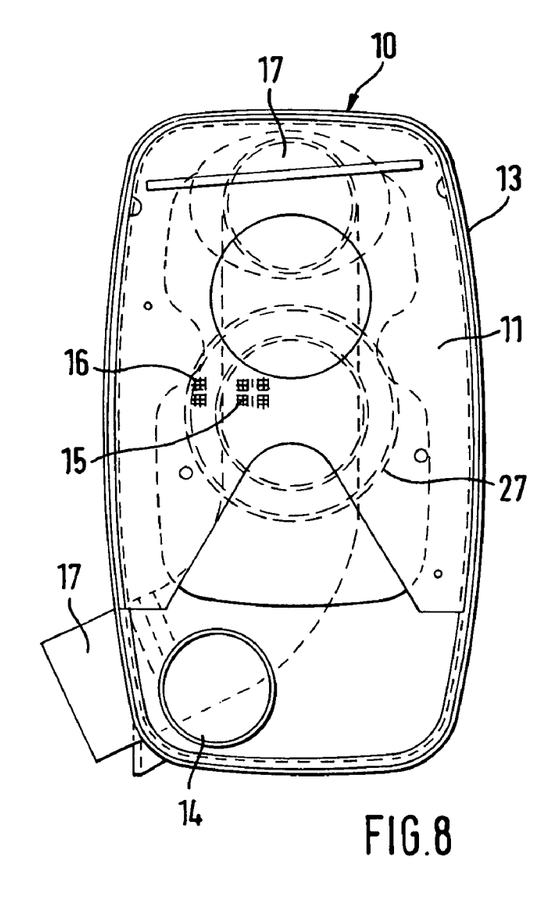

With the embodiment of FIGS. 7 and 8, the P-cat 15 and the PM separator 16 used here are each circular cylindrical but have different diameters and in a common housing 27 are disposed axially after one another, yet separated by a transfer chamber 28 that widens in a tunnel-shaped manner from the discharge surface or plane of the P-cat 15 to the entry surface or plane of the PM separator 16. Here, the exhaust gas inlet tube 14 is extended relatively far into the interior of the muffler 10 to shortly before the end tube 17, and is also provided with a perforation or holes 21. The housing 27, with built-in P-cat 15 and PM separator 16, is built into the muffler 10 above the exhaust gas inlet tube 14 and parallel to the axis 19 of the muffler, and is held within the muffler, as are the exhaust gas inlet tube 14 and the end tube 17 by two transverse walls 29,30. In this connection, the transverse wall 29 is made gas permeable by holes or a perforation, whereas the other transverse wall 30, which is parallel to the transverse wall 29, has a gas tight configuration and thus in conjunction with the front end wall 11 and the peripheral outer wall 13 delimits a discharge chamber 31. The PM separator 16 opens out into the discharge chamber 31 from which the end tube 17 starts. In this connection, the housing 27, the end tube 17 and the exhaust gas inlet tube 14 are accommodated in a gas tight manner in openings or apertures of the transverse wall 30. Between the transverse wall 30 and the rear end wall 12 the interior of the muffler can, due to the gas-permeability of the transverse wall 29, be filled with exhaust gas that exits the inlet tube 14 radially and axially, so that also with this embodiment the housing 27, with the P-cat 15 and PM separator 16, can be preheated or held to a favorable operating temperature.

In general, all of the embodiments fulfill the following inventive features:

a) The free exhaust gas inlet surface or plane of the P-cat 15 is considerably smaller than the exhaust gas inlet surface or plane of the PM separator or separators 16.

b) The aspect ratio AR=length (l)/diameter$_{eff}$($Ø_{eff}$) is approximately between 0.4 and 0.6 for the P-cat 15.

c) The aspect ratio AR=length (l)/diameter$_{eff}$($Ø_{eff}$) of the PM separator or separators 16 is approximately between 0.5 and 1.0.

d) The volume of the P-cat 15 is approximately between 2.5 and 4 liters, the volume of the or all of the PM separators 16 is approximately between 5.5 and 22 liters, and the ratio volume P-cat 15/volume of the or all of the PM separators 16 is approximately between 0.15 and 0.55.

e) The relation aspect ratio for the or all of the PM separators 16/aspect ratio P-cat 15 is approximately between 1.05 and 2.2.

f) At maximum exhaust gas volume flow [$Nm^3/h$], the channel velocity KG (=exhaust gas volume flow/free exhaust gas inlet surface) in the P-cat 15 should be greater than 8 m/sec and in the PM separator or separators 16 greater than 5 m/sec, whereby the maximum exhaust gas volume flow is limited by the maximum permissible pressure loss and the maximum permissible exhaust gas counter pressure with regard to the functionality of the internal combustion engine that supplies the exhaust gas.

The term $\emptyset_{\mathit{eff}}$ mentioned in b) and c) indicates the diameter that is effective at the inlet of the round inlet surface of the P-cat 15 and of the PM separator 16 (for the case where only one is used), or where a plurality of PM separators 16 are used, their effective overall inlet surface assuming a circular surface and the diameter resulting therefrom.

Listed in the table of FIG. 9 are ten tested examples of combinations of different P-cats 15 and a different number of different PM separators 16, and the conversion rates (particle separation rates) resulting herefrom pursuant to ESC (European Steady State Cycle) and ETC (European Transient Cycle). To avoid repetition, the table of FIG. 9, and the contents thereof, are made a part of this specification. The testing of the individual variants is effected with a diesel engine, which supplies exhaust gas having a raw particle emission of the order of magnitude of about 40 mg/KWh at ESC-Test, and of about 50 mg/KWh at ETC-Test, in each case at a maximum exhaust gas volume flow of 1200 Nm³/h. At this maximum exhaust gas volume flow, the channel velocities and conversion rates listed in the Table of FIG. 9 result.

Figure 1:
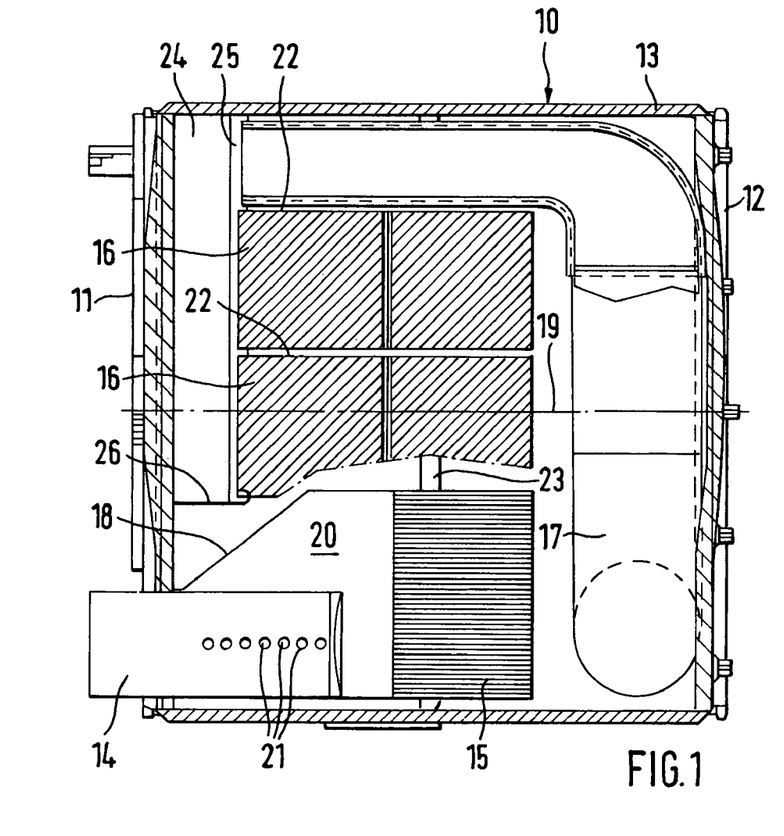
FIGS. 1 and 2 show, in a longitudinal section and in a front view respectively, a first embodiment of the invention.
Figure 2:
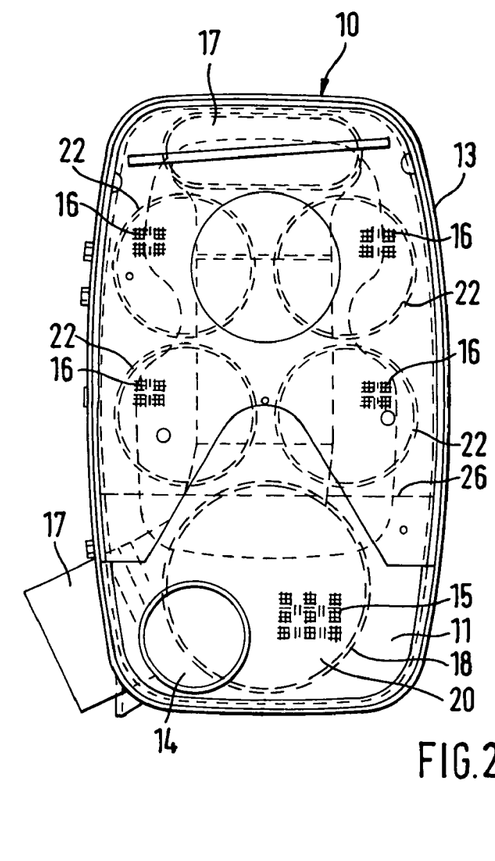

In the examples of FIGS. 1 and 2, it was attempted to increase the conversion rate with 3 variants (1–3), in each case with the same P-cat 15 and with the use of PM separators 16 having the same diameter but different lengths. The best mode solution is represented by variant 3. This shows that the longer the PM separator or separators 16 are, despite a relatively small diameter, the greater is the conversion rate. The elongated embodiment of the PM separator 16 is therefore very expedient.

Figure 3:
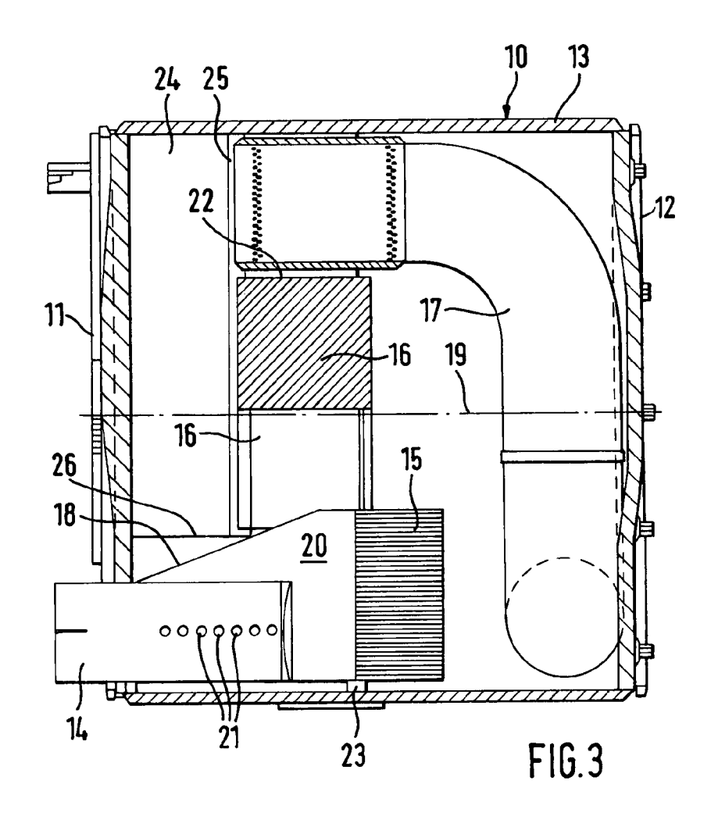
FIGS. 3 and 4 show, in a longitudinal section and in a front view respectively, a second embodiment of the invention.
Figure 4:
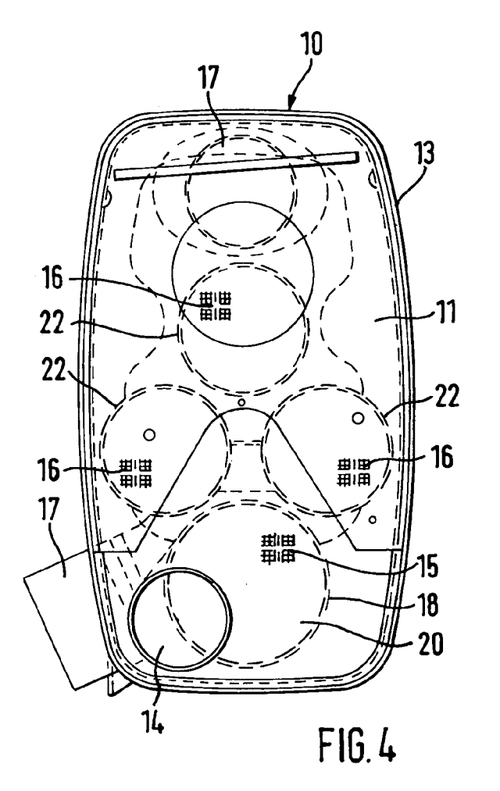

In the example of FIGS. 3 and 4, in conformity with the variants 4 and 5 in each case three identical PM separators 16 were associated with a respectively different P-cat 15.

Figure 5:
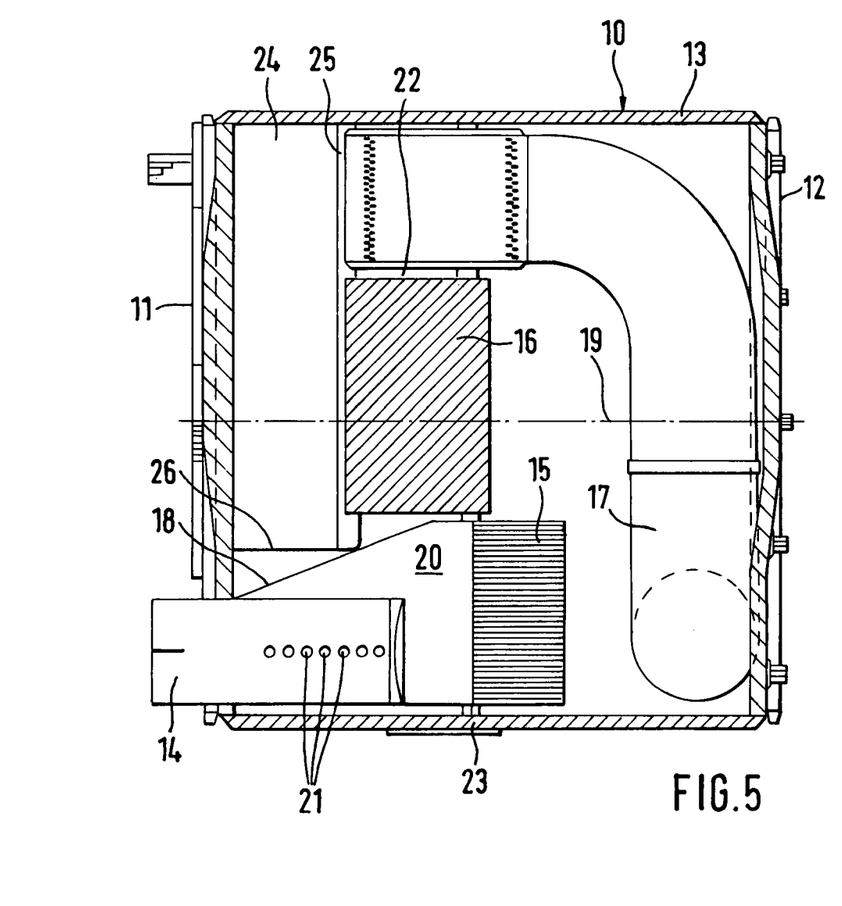
FIGS. 5 and 6 show, in a longitudinal section and in a front view respectively, a third embodiment of the invention.
Figure 6:
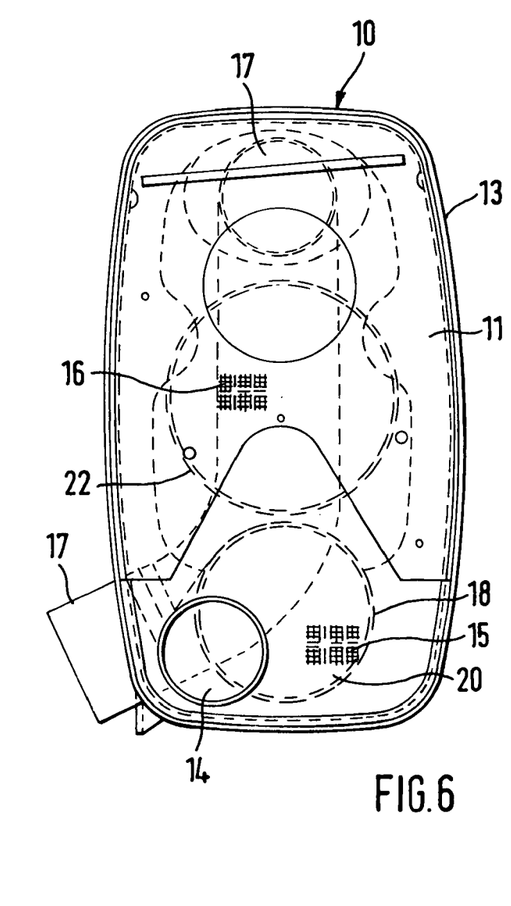

In the examples of FIGS. 5 and 6, with the variant 6 a PM separator 16 having a similar total volume to the three PM separators 16 of the variants 4 and 5 was used in conjunction with the same P-cat 15. Comparably good conversion rates were established.

In the example of FIGS. 7 and 8, in the four variants 7–10 in each case a PM separator 16 having a different cellular structure was combined with a P-cat 15 that either had a different cellular structure or a different diameter.

All of the variants had ETC conversion rates of at least 50%, while in the peak with the variant 3, a phenomenal 79% was achieved. In the tested variants 1 to 10, PM separators 16 not having a platinum coating were used. However, there are also certainly applications where the use of platinum-coated PM separators 16 is necessary. Thus, the invention is applicable not only to uncoated but also to platinum-coated PM separators 16. In addition, it is possible to use P-cats 15 and PM separators 16 having a cellular structure other than that given. Furthermore, as a modification of the illustrated embodiment, it is, of course, also possible to combine a P-cat 15 with two, five or six PM separators 16 in the event that there is sufficient space in the muffler 10 and/or the amount of muffling to be achieved to permit this.

The specification incorporates by reference the disclosure of German priority document 103 16 802.8 filed Apr. 11, 2003.

The present invention is, of course, in no way restricted to the specific disclosure of the specification and drawings, but also encompasses any modifications within the scope of the appended claims.

We claim:

1. A combination exhaust gas post treatment/muffler device in the exhaust gas section of an internal combustion engine, comprising:

a muffler that is spatially delimited by a front end wall, a rear end wall, and a peripheral outer wall, wherein said muffler is provided with an inlet tube for receiving exhaust gas that is to undergo post treatment;

at least one preliminary oxidation catalytic converter that is disposed in an interior of said muffler and significantly increases an amount of $NO_2$ in exhaust gas flowing through said muffler;

at least one particle separator disposed in said interior of said muffler, wherein after flowing through said at least one preliminary oxidation catalytic converter and said at least one particle separator, exhaust gas, in a clean and indirectly muffled state, is adapted to be conveyed out of said muffler;

wherein a free exhaust gas inlet surface of said at least one catalytic converter is considerably smaller than a free exhaust gas inlet surface of said at least one particle separator;

wherein an aspect ratio $AR=l/\emptyset_{\mathit{eff}}$ of said at least one preliminary oxidation catalytic converter is approximately between 0.4 and 0.6;

wherein an aspect ratio $AR=l/\emptyset_{\mathit{eff}}$ of said at least one particle separator 16 is approximately between 0.5 and 1.0;

wherein a volume of said at least one preliminary oxidation catalytic converter is between approximately 2.5 and 4 liters, wherein a volume of said at least one particle separator is between approximately 5.5 and 22 liters, and wherein a ratio of the volume of said at least one catalytic converter to the volume of said at least one particle separator is between approximately 0.15 and 0.55;

wherein a ratio of the aspect ratio of said at least one particle separator 16 to the aspect ratio of said at least one preliminary oxidation catalytic converter is between approximately 1.05 and 2.2; and wherein at a maximum exhaust gas volume of flow (Nm³/h) a channel velocity in said at least one preliminary oxidation catalytic converter is greater than 8 m/sec and in said at least one particle separator is greater than 5 m/sec, wherein the maximum exhaust gas volume flow is delimited by a maximum permissible pressure loss, and a maximum permissible exhaust gas counter pressure with respect to a functionality of the internal combustion engine supplying exhaust gas.

2. A combination exhaust gas post treatment/muffler device according to claim 1, wherein the at least one preliminary oxidation catalytic converter has a circular cylindrical form with a dimension=diameter×length of 220×101.5 mm or 200×101.5 mm, in each case with a cellular structure of 160 or 200 cpsi, or 180×101.5 with a cellular structure of 160 cpsi, and also has a platinum coating in an order of magnitude of 5 g/1000 Nm3/h exhaust gas volume flow, in other words, approximately 1.0 to 1.5 g/liter of volume.

3. A combination exhaust gas post treatment/muffler device according to claim 1, wherein four identical particle separators, each having a circular cylindrical form, are disposed in said muffler for parallel flow therethrough, wherein each particle separator has a dimension=diameter×length of either 150×150 mm or 150×225 mm or 150×300 mm, in each case with a cellular stucture of 200 cpsi.

4. A combination exhaust gas post treatment/muffler device according to claim 1, wherein three particle separators, each having a circular cylindrical form, are disposed in said muffler for parallel flow therethrough, wherein each of said particle separators has a dimension=diameter×length of 150×150 mm with a cellular structure of 200 cpsi.

5. A combination exhaust gas post treatment/muffler device according to claim 2, wherein disposed in said muffler, in addition to said at least one catalytic converter, is a particle separator having a circular cylindrical form and a dimension=diameter×length of either 254×150 mm or 220×225 mm, in each case with a cellular structure of 200 cpsi, or 220×150 with a cellular structure of 160 cpsi.

6. A combination exhaust gas post treatment/muffler device according to claim 1, which includes one preliminary oxidation catalytic converter with at least one particle separator and has the detailed features of the variants listed in Table of FIG. 9, wherein the values for the channel velocity KG and the conversion in all variants results on the basis of a maximum exhaust gas volume flow of 1200 $Nm^3/h$, and a raw particle emission of the exhaust gas in an order of magnitude of approximately 40 mg/KWh with an ESC-test and approximately 50 mg/KWh ETC-test.

* * * * *